US012373220B2

(12) United States Patent
Spertus et al.

(10) Patent No.: US 12,373,220 B2
(45) Date of Patent: Jul. 29, 2025

(54) UNIFIED AUTOMATION OF APPLICATION DEVELOPMENT

(71) Applicant: Amazon Technologies, Inc., Seattle, WA (US)

(72) Inventors: Mike Paul Spertus, Chicago, IL (US); Timothy Simon Bell, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 974 days.

(21) Appl. No.: 17/489,571

(22) Filed: Sep. 29, 2021

(65) Prior Publication Data
US 2023/0096376 A1   Mar. 30, 2023

(51) Int. Cl.
| G06F 9/46 | (2006.01) |
| G06F 9/38 | (2018.01) |
| G06F 9/48 | (2006.01) |
| G06F 9/50 | (2006.01) |
| G06F 9/52 | (2006.01) |

(52) U.S. Cl.
CPC ......... *G06F 9/3869* (2013.01); *G06F 9/3826* (2013.01); *G06F 9/3836* (2013.01); *G06F 9/4812* (2013.01); *G06F 9/4881* (2013.01); *G06F 9/5038* (2013.01); *G06F 9/52* (2013.01)

(58) Field of Classification Search
CPC .... G06F 9/3869; G06F 9/3826; G06F 9/3836; G06F 9/4812; G06F 9/4881; G06F 9/5038; G06F 9/52
See application file for complete search history.

(56) References Cited

U.S. PATENT DOCUMENTS

| 9,043,747 | B2 | 5/2015 | Eksten et al. |
| 9,369,472 | B2 | 6/2016 | Saldhana |
| 9,584,439 | B2 | 2/2017 | Leafe et al. |
| 9,583,962 | B1 | 12/2017 | Krishnaprasad et al. |
| 10,033,833 | B2 | 7/2018 | Fu et al. |
| 10,234,853 | B2 | 3/2019 | Mukkamala et al. |
| 10,650,427 | B2 | 5/2020 | Bursey |
| 10,762,475 | B2 | 9/2020 | Song et al. |
| 2021/0349736 | A1* | 11/2021 | Callery ............... G06F 9/44505 |
| 2022/0129301 | A1* | 4/2022 | Adeyenuwo .......... G06F 9/4843 |

* cited by examiner

*Primary Examiner* — Tammy E Lee
(74) *Attorney, Agent, or Firm* — Robert C. Kowert; Kowert, Hood, Munyon, Rankin & Goetzel, P.C.

(57) ABSTRACT

Unified automation of application development and delivery is provided. An automation pipeline execution coordinator may define a pipeline specification that includes actions to be performed, a triggering event definition and specification for determining execution context. The coordinator may concurrently detect triggering events for multiple pipelines matching the pipeline specification, and responsive to the detecting, determine execution contexts for the pipelines. The coordinator may then execute the multiple pipelines, where execution may proceed independently for pipelines with differing execution contexts. For pipelines sharing an execution context, execution of various actions of the respective pipelines may be coordinated. Execution context may be determined according to the specification for determining execution context, which may include an overridable default specification that determines context by locations of source data related to the triggering event. Pipeline specifications may be defined using pipeline specification templates and input from users obtained via various user interfaces.

20 Claims, 9 Drawing Sheets

```
                    pipeline specification 500
510 Name: validate
512 Triggers:
514   - Types: [Push]
516     Destinations:
518         Branches:
520             - dev-.*
522     FilesChanged:
524         - src/.*
526         - tst/.*
528 Actions:
530     Build:
532         Identifier: actions/codebuild-build@v1
534         Configuration:
536             ProjectName: BuildCode2
538         OutputArtifacts:
540            - BuiltApp
542     RunUnitTests:
544         Identifier: actions/codebuild-run-unit-tests@v1
546         Configuration:
548             ProjectName: RunUnitTests2
550         InputArtifacts:
552            - BuiltApp
554     CheckLicense:
556         Identifier: actions/codebuild-check-license@v1
558         Configuration:
560             ProjectName: RunLicenseCheck2
```

FIG. 5

```
                    pipeline specification template 600
610 Name: release
612 Triggers:
614    - Types: [Push]
616      Destinations:
618         Branches:
620            - release
621      Context: ${executionContext}
622 Actions:
624    Build:
626       Identifier: actions/codebuild-run-build@v1
628       Configuration:
630          ProjectName: ${buildProjectName}
632       OutputArtifacts:
634          - BuiltApp
636    Test:
638       Identifier: actions/codebuild-run-unit-tests@v1
640       Configuration:
642          ProjectName: ${testProjectName}
644       InputArtifacts:
646          - BuiltApp
648    Deploy:
650       DependsOn:
652          - Test
654       Identifier: actions/s3-deploy@v1
656       Configuration:
658          BucketName: ${deployBucketName}
660          Extract: "true"
```

```
                    pipeline specification 610
662 Variables:
664     ${buildProjectName}  : my-build-project
667     ${testProjectName}   : my-test-project
668     ${deployBucketName}  : my-deploy_project
669     ${executionContext}  : my-context
670 Imports:
672     - release
```

FIG. 6

UNIFIED AUTOMATION OF APPLICATION DEVELOPMENT

BACKGROUND

Modern application development, testing and deployment frequently relies on various toolchains that may be automated using a process automation tool to provide development capabilities such as Continuous Integration (CI) and Continuous Deployment (CD). Traditionally, CI and CD have employed concepts frequently known as workflows, or flows, and pipelines. While workflows and pipelines share similar characteristics, workflows may often proceed independently while pipelines may often require coordination with other pipelines. Thus CI tasks are often implemented using workflows while CD tasks may instead use pipelines.

Application of workflows and pipelines, however, are not always clear cut. Some CI tasks may rely on resources that may constrain multiple CI tasks to operate sequentially while some CD tasks may designed to be performed independently of other CD tasks. Thus, the choice of workflows and pipelines for various tasks is not always clear or well understood.

BRIEF DESCRIPTION OF THE DRAWINGS

FIG. 5 is a diagram illustrating a pipeline specification, according to some embodiments.

FIG. 6 is a diagram illustrating a pipeline specification defined using a pipeline specification template, according to some embodiments.

Figure 1:
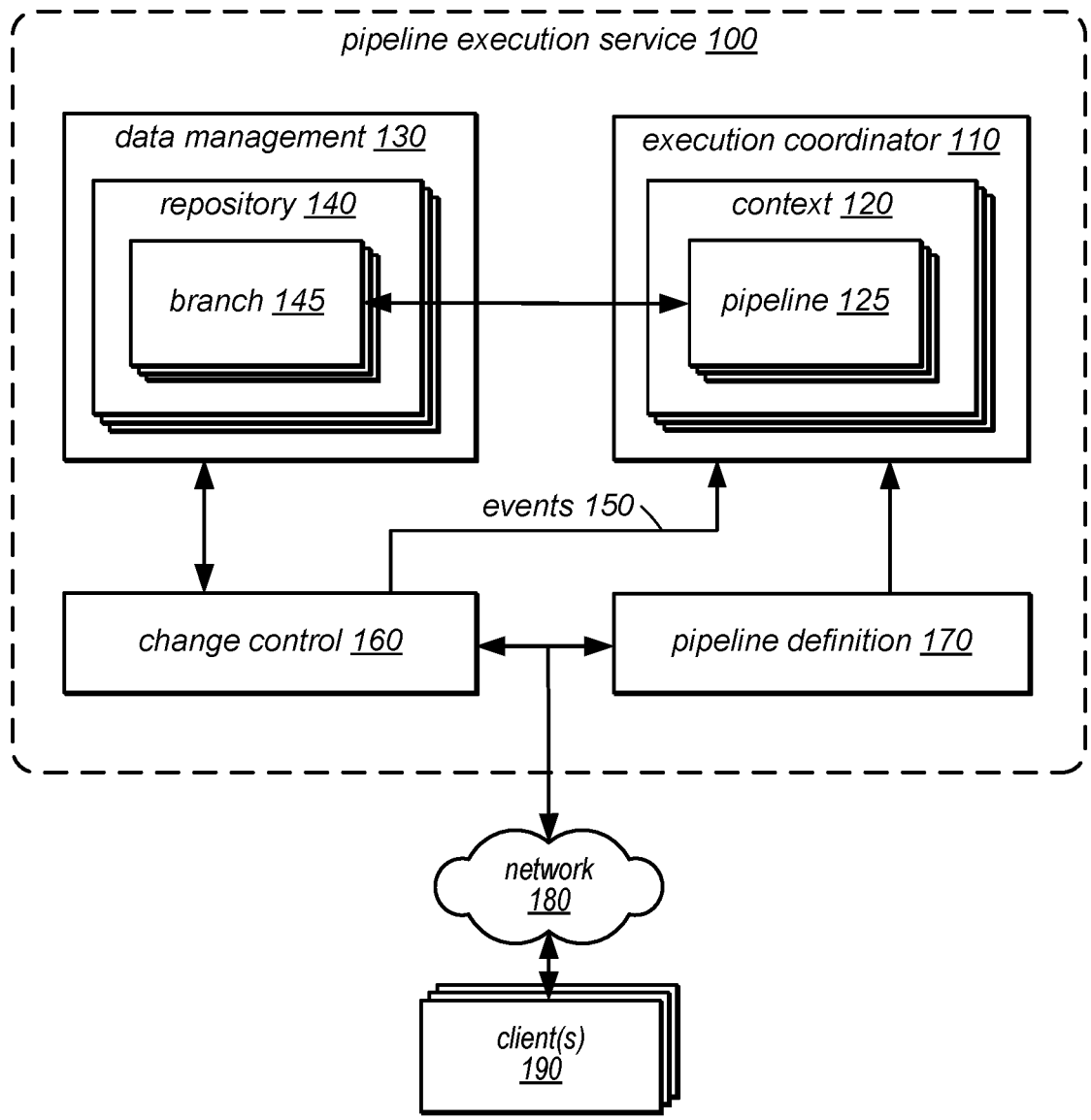
FIG. 1 is a block diagram illustrating unified automation of application development, according to some embodiments.

While embodiments are described herein by way of example for several embodiments and illustrative drawings, those skilled in the art will recognize that the embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Modern application development, testing and deployment frequently relies on various toolchains that may be automated using a process automation tool to provide development capabilities such as Continuous Integration (CI) and Continuous Deployment (CD). Traditionally, CI and CD have employed concepts frequently known as workflows, or flows, and pipelines. While workflows and pipelines share similar characteristics, workflows may often proceed independently while pipelines may often require coordination with other pipelines. Thus CI tasks are often implemented using workflows while CD tasks may instead use pipelines.

Systems and methods implementing unified automation of application development including a unified model for pipeline execution are described. A pipeline specification that includes actions to be performed, a triggering event definition and specification for determining execution context may be defined. Using this pipeline specification, a number of triggering events may be detected matching the pipeline specification and, responsive to the detecting, pipelines with determined execution contexts may be initiated.

Execution of these pipelines may proceed independently for pipelines with differing execution contexts while pipelines sharing a same execution context may be coordinated. Execution context may be determined according to the specification for determining execution context, which may include an overridable default specification that determines context by locations of source data related to the triggering event. Pipeline specifications may be defined using pipeline specification templates and input from users obtained via various user interfaces.

Clients may benefit from the simplification that a unified model for pipeline execution provides as it is frequently unclear to clients the differences between to traditional workflows and pipelines and when one is more appropriate that the other for a particular automation task. By determining execution context, an automation executive may automatically determine the proper behavior for an automation, with the execution context determined using a default context specification that may be overridden by the client. By unifying these workflow and pipeline concepts, a simplified user interface may be presented for creating automation pipelines.

The specification first describes an example network-based pipeline execution service that performs automation of pipeline executions according to a unified pipeline model. Included in the description of the example network-based pipeline execution service are various aspects of an example network-based application development and delivery service that may employ the pipeline execution service. The specification then describes flowcharts of various embodiments of methods for implementing various aspects of the pipeline execution service. Next, the specification describes an example system that may implement the disclosed techniques. Various examples are provided throughout the specification.

FIG. 1 is a block diagram illustrating a service implementing unified automation of application development, according to some embodiments. A pipeline execution service 100 may provide various application development services for clients 190 connected over a network 180. The pipeline execution service 100 may be a component of a larger service in some embodiments, for example the pipeline execution service 100 may provide automated execution of application development, build, delivery and deployment processes for a service shown in greater detail below in FIG. 2. It should be understood, however, that application development, testing and deployment is but one example where such a pipeline execution service may be applied and the above example is not intended to be limiting.

Clients 190 may, in some embodiments, interact with various elements of the pipeline execution service 100. For example, a client 190 may interact with a change control module 160 to implement changes to data stored in various branches 145 of data repositories 140 provided by data management 130. Various operations initiated by clients, such as changes to the data repositories 140, may result in the signaling of various events 150, in some embodiments. While the events 150 may, in some embodiments, originate from change control module 160 as shown in FIG. 1, events 150 may originate from any number of sources, including directly from the client 190. These examples of event origination are not intended to be limiting, and any number of event sources may be imagined.

Separately, clients 190 may interact with the pipeline execution service 100 to define a pipeline definition 170. This pipeline definition 170 may include a set of actions to be performed by the pipeline as well as definitions for detecting pipeline events and determining contexts 120 in which the pipelines will execute. Further detail on the pipeline definitions 170 is provided below in FIGS. 5 and 6.

Figure 2:
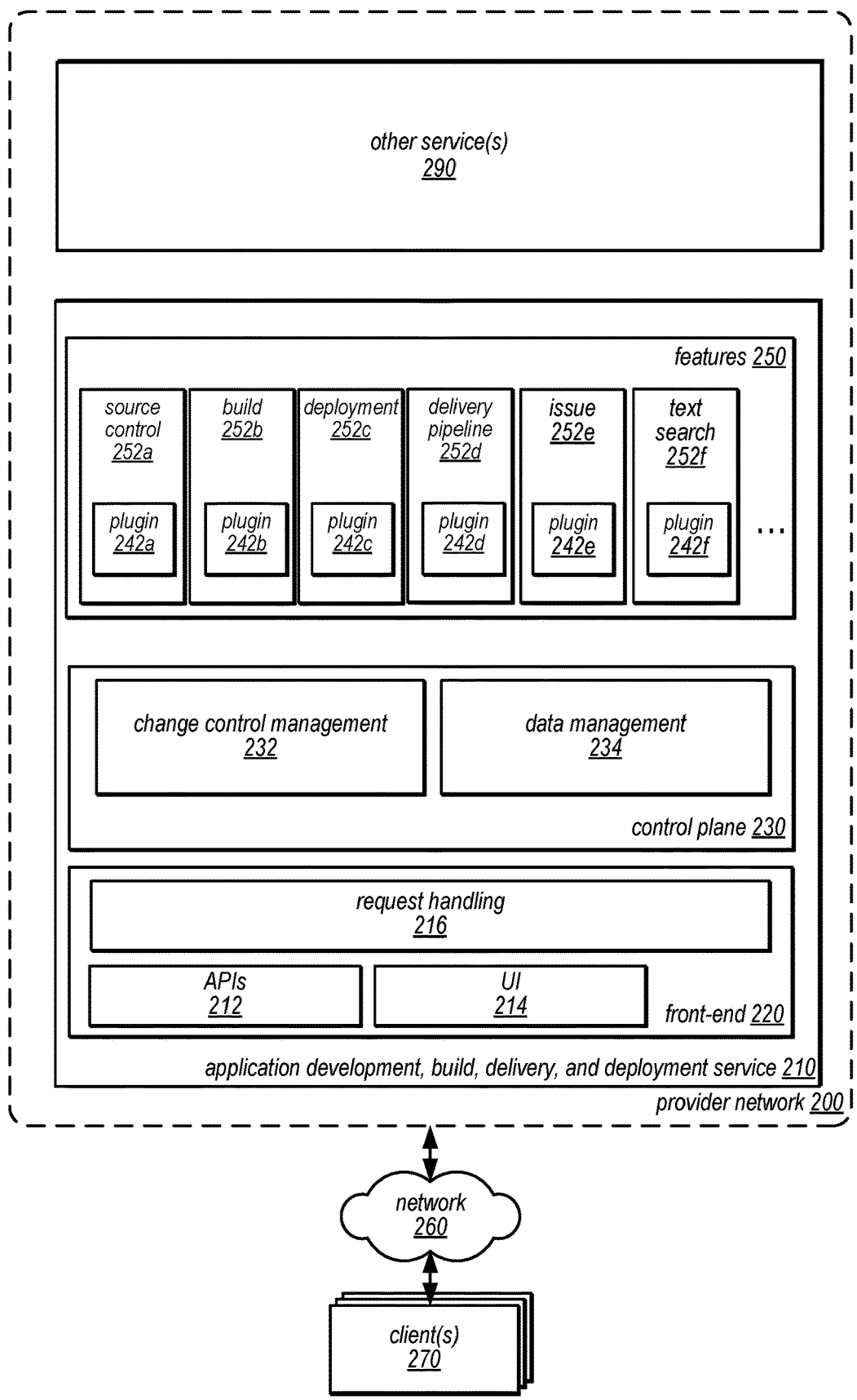
FIG. 2 is a block diagram illustrating a provider network that may implement an application development, build, deployment, and delivery service that implements unified automation of application development, according to some embodiments.

FIG. 2 is a block diagram illustrating a provider network that may implement an application development, build, deployment, and delivery service that implements unified automation of application development, according to some embodiments. Provider network 200 may be formed as a number of regions, where a region is a separate geographical area in which the cloud provider clusters data centers. Each region may include two or more availability zones connected to one another via a private high-speed network, for example a fiber communication connection. An availability zone (also known as an availability domain, or simply a "zone") refers to an isolated failure domain including one or more data center facilities with separate power, separate networking, and separate cooling from those in another availability zone.

Preferably, availability zones within a region may be positioned far enough away from one other that the same natural disaster should not take more than one availability zone offline at the same time. Users may connect to availability zones of the provider network 200 via a publicly accessible network (e.g., the Internet, a cellular communication network). Regions are connected to a global network which includes private networking infrastructure (e.g., fiber connections controlled by the cloud provider) connecting each region to at least one other region. The provider network 100 may deliver content from points of presence outside of, but networked with, these regions by way of edge locations and regional edge cache servers. An edge location may be an extension of the cloud provider network outside of the traditional region/AZ context. For example an edge location may be a data center positioned to provide capacity to a set of customers within a certain latency requirement, a set of servers provided to a customer's premises, or a set of servers provided within (or forming part of) a cellular communications network, each of which may be controlled at least in part by the control plane of a nearby AZ or region. This compartmentalization and geographic distribution of computing hardware enables the provider network 200 to provide low-latency resource access to customers on a global scale with a high degree of fault tolerance and stability.

The traffic and operations of the cloud provider network may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system.

The control plane generally includes one or more control plane components distributed across and implemented by one or more control servers. Control plane traffic generally includes administrative operations, such as system configuration and management (e.g., resource placement, hardware capacity management, diagnostic monitoring, system state information).

The data plane includes customer resources that are implemented on the cloud provider network (e.g., compute instances, containers, block storage volumes, databases, file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

In some embodiments, provider network 200 may include the hardware (e.g., modems, routers, switches, load balancers, proxy servers, etc.) and software (e.g., protocol stacks, accounting software, firewall/security software, etc.) necessary to establish a networking links between different components of provider network 200, such as computation and storage hosts, control plane components as well as external networks, such as network (e.g., the Internet). In some embodiments, provider network 200 may employ an Internet Protocol (IP) tunneling technology to provide an overlay network via which encapsulated packets may be passed through the internal network using tunnels. The IP tunneling technology may provide a mapping and encapsulating system for creating an overlay network and may provide a separate namespace for the overlay layer and the internal network layer. Packets in the overlay layer may be checked against a mapping directory to determine what their tunnel target should be. The IP tunneling technology provides a virtual network topology; the interfaces that are presented to clients, such as clients 105 in FIG. 1, may be attached to the overlay network so that when a client 105 provides an IP address that they want to send packets to, the IP address is run in virtual space by communicating with a mapping service that knows where the IP overlay addresses are.

Provider network 200 may implement many services, such as other services 290 that provide various types of computing, storage, management, network, or other services. As discussed in detail with regard to FIGS. 2-6, provider network 200 may implement application development, build, delivery, and deployment service 210 that enables developers to plan, write, test, and deliver software as part of a team or engineering organization. Various features of application development, build, delivery, and deployment service 210 may enable more developers to deliver efficiently, safely, and quickly. Application development, build, delivery, and deployment service 210 may offer various tools and capabilities (as well as allowing developers to add, adapt or implement further tools) that developers need to accomplish their tasks. As developers continue to use the tools of application development, build, delivery, and deployment service 210, various features may support the integration of development projects with an developing organization's standards, expanding the usage to more and more teams of the organization. Application development, build, delivery, and deployment service 210 may, in some embodiments, provide a web client that lives outside provider network 200's management console, a developer identity and authorization system that supports both individual and workforce identities, and an end-to-end developer toolchain that improves on existing solutions in terms of breadth and by making it easy for developers to successfully achieve software development velocity and quality at scale due to the extensibility and scalability offered by system features such as change control management 232 and data management 234.

Application development, build, delivery, and deployment service 210 may utilize various tools and other services as building blocks to provide core functionality and a web UI to deliver a unified end-to-end experience. Some features of application development, build, delivery, and deployment service 210 will allow developers to centralize management of their software development projects, including access control, easy implementation of software development life cycle (SDLC) best practices, auditing, and software provenance tracking. The set of capabilities provided by these features may include the ability to execute workflows, define and enforce best practices, and track compliance.

Application development, build, delivery, and deployment service 210 may provide centralized data management and change control systems, which may standardize and simplify how data is shared between systems owned by different teams. This should allow the overall experience to feel more unified regardless of our organization's structure, while also simplifying the implementation of features that were historically difficult to build, such as a "track changes" view with near-real-time updates from across the toolchain, or a personalized activity dashboard that spans product areas.

Application development, build, delivery, and deployment service 210 may use a set of tools (e.g., different services) or other features that can act as or utilize respective plugins developed and operated by for the different tools (e.g., source, artifacts, build, test, deploy, issues). The plugins may integrate may integrate with the tools to expose their functionality to end users. The platform services include a web UI 214 framework based on a micro-frontend architecture and a shared API layer. Application development, build, delivery, and deployment service 210 a data management system to facilitate data sharing across tools—and change control management that standardizes the way users perform mutating actions in application development, build, delivery, and deployment service 210.

Application development, build, delivery, and deployment service 210 may implement interface 220 which may include various features for interacting including Application Programming Interfaces (APIs) 212 and a User Interface. For example, APIs 212 may be implemented as a Software Development Kit (SDK) which may include operations to create, read, update, and/or delete various documents which are authored as part of Application development, build, delivery, and deployment service 210. User interface (UI) may be a web, or other graphically based, development environment that allows for various features, including leveraging a micro-front-end framework for packaging and routing client-side applications Text searches, as well as updates that cause index updates may be received or performed through APIs 212 and/or other user interfaces of application development, build, delivery, and deployment service 210.

Control plane 230 may be implemented as part of application development, build, delivery, and deployment service 210 and may include change control management 232 and data set management 234. Data set management 234 may accept data from data providers, manage schemas for the data, manage subscriptions for data consumers and store non-authoritative copies of the data, as discussed in detail below with regard to FIG. 3. Change control management 232 may manage potential changes that can be pre-evaluated, mediate between change approvers, and change performers, and maintain an authoritative reference to the desired state of each resource under its governance, as discussed in detail below with regard to FIG. 4.

As noted earlier, plugins may include plugins 242a, 242b, 242c, 242d and 242e, which may bused to access various development tools, such as features 250, including but not limited to source control 252a, build 252b, deployment 252c, delivery pipeline 252d, issue handling 252e, and text search 252f, which is discussed in detail below with regard to FIGS. 5-8. Plugins may include web service APIs for change control management 232 and data set management 234 as well as callbacks (similar to webhooks) invoked by those components. Plugins can run on their own infrastructure, and can use whatever technologies wanted to develop plugins; plugins can run on various execution resources in provider network 200 (e.g., various compute or other services). Plugin authors will be able to use generated clients to call change control management 232 and data set management 234 APIs, and for first-party plugins they will be able to use an authorization service to authenticate directly to these systems. At the same time, change control management 232 will pass along the details of the authenticated end user to plugins when changes are requested. Plugin responsibilities may be defined in terms of what document schemas they work with; they may consume some schemas, produce others, and enact changes for the documents they claim responsibility for. Plugins may use registration APIs to indicate which schemas they handle or subscribe to, as discussed below with regard to FIG. 3. This model allows significant flexibility for adding or improving tools, while keeping a consistent experience and facilitating cross-cutting features like governance and data sharing.

Application development, build, delivery, and deployment service 210 may provide a unified end-to-end developer toolchain with governance controls that enable organizations to empower their development teams to deliver software to production with confidence. In order to implement useful governance controls, change control management 232 and data management 234 may allow application development, build, delivery, and deployment service 210 to process information from the end-to-end toolchain in order to present actionable insights to end users as well as make automated decisions about changes according to user-configured policies. As each tool may be completely independent and manages its own data implementing change control management 232 and data management 234 may support combining information from across different tools without disrupting the roadmaps or API designs of the individual tool developers that provide the authoritative data.

Change control management 232 may provide a centralized system to orchestrate policy evaluation and change enactment. Each tool 250 may have its own APIs for enacting changes, with varying styles and capabilities (e.g., put vs. update APIs, declarative vs. imperative models, divergent capabilities for injecting approval requirements, etc.). Change control management 232 may provide a common way to access toolchain data to aid integrations into development, build, delivery, and deployment service 210 and a single place to contribute their own data. Change control management 232 allows for an interface to gain influence over the entire toolchain (subject to customer-defined rules and authorization, in some scenarios).

In some embodiments, clients of change control management 232 and data management 234 (aside from these two systems themselves) may be considered a plugin (e.g., various features 250). A plugin may be a component that is doing some combination of producing data, consuming data, enacting, approving, or requesting changes. For example, an interface, such as UI 214 may be plugin (although illustrated separately in FIG. 2). For example, it produces data about end user activity, consumes data from many other plugins, and requests changes on behalf of the end user. There could also be an aggregator system plugin that uses a tool like Apache Flink to consume data, process it, and produce aggregations to power browse experiences in the UI 214 or to precompute key metrics for display in an integrated development environment (IDE) or use in other plugins. In various embodiments, plugins may not interact directly with one another and can produce data under shared schemas that can be consumed without needing to depend on a specific implementation. For example, there could be a common schema for a document that describes the new commits being added in a pull request; a UI 214 that visualizes this information would not need to produce a separate implementation for each source control tools supported in application development, build, delivery, and deployment service 210. In other scenarios, proprietary schemas for scenarios with differentiated features can also be implemented.

In various embodiments, control plane 230 may be implemented as a document-oriented control plane to expose the user-configurable parts of the toolchain and to expose data about the resources in the system. As noted above, application development, build, delivery, and deployment service 210 may have a unified front end control plane layer that handles both read and write requests. In the front end, read requests may be forwarded to data management 234 (or to indexes populated from data management 234). Write requests may be accomplished through a "requestChange( )" API, where the caller passes the ID and requested content of a document supported by the system. The change can be evaluated by an extensible set of plugins before being committed, and a variety of provider plugins implemented by product area teams can enact the requested change once it is approved.

A document-oriented control plane 230 helps application development, build, delivery, and deployment service 210 provide a uniform layer where aggregations, provenance tracking, and comprehensive governance controls can be implemented in a consistent and highly generalized way. Developers of a tool 250 can define their resource configurations and data in terms of document schemas, and then the work of aggregating, tracking, or governing these documents can be done by a different tool 250 with minimal coordination after the schema has been established. Additionally, application development, build, delivery, and deployment service 210 may be extensible to meet user needs over the long term; the document schemas provide a natural extension point, because any plugin that produces the required documents or can enact changes using a common schema can be used. For example, given a common set of schemas for source control documents, users could use a built-in source control system or a source control system offered by a different organization or provider (e.g., different from provider network 200 and application development, build, delivery, and deployment service 210) with zero or minimal impact to the rest of the experience.

As noted above, application development, build, delivery, and deployment service 210 uses data management 234 to be a central data management system to allow different tools to share data with one another. Data management 234 may implement a publish/subscribe model, where some plugins write new document versions or events and other plugins can consume them. Data management 234 may implement a subscription system that supports subscriptions to a single document, a document type/schema, or to a grouping of documents (e.g., which may be called a partition). Data management 234 may introduce the concept of partitions to allow document updates to be ordered within a document group; for example, this can be leveraged to build a provenance tracking system where consumers of provenance tracking data will be able to depend on referential integrity within a partition because the publisher has ordered documents in an order where (for example) document creation events come before references to the created document. In addition to provenance tracking, the publish/subscribe system may be used to implement near-real-time aggregation and to populate search indexes and other specialized query engines (such as a graph database).

Data management 234 may not need to contain all data in application development, build, delivery, and deployment service 210 to support the various features discussed above. At the same time, it may have enough data that new projects to produce aggregations or that need to trigger off events coming from the toolchain will be able to satisfy most of their needs from existing documents in data management 234. There may be no firm requirements, in some embodiments, about what data is to be maintained in data management 234, as opposed to being made available through pass-through APIs to tools 250 or other data sources (e.g., data stored in other service(s) 290).

As noted above, control plane 230 that implements features like change control management 232 and data management 234 may provide an extensible and adaptable application development, build, delivery, and deployment service 210. For example, if it were desirable to add a new feature, such as new tool 250 to application development, build, delivery, and deployment service 210, such as a "track changes" feature that allows users to find out where a change is in their continuous delivery (CD) pipeline with integrated context from across the toolchain, the user experience may be designed first. This user experience may might include the presentation of some information and a navigation structure. Then, the API contract between the client and application development, build, delivery, and deployment service 210 (e.g., in a user interface implemented on a client 270, this could be the API that JavaScript would use to get data and push notifications). In the case of track changes, the API would return data with a given schema designed to support the needs of the user experience. This schema could be registered in data management 234.

Next, development of the track changes feature can be made based on example data pushed to data management 234 following this schema. In parallel, an aggregation process can be designed. For track changes, there may need to be some new data produced by the existing feature plugins (e.g. populating a missing identifier) as well as a new aggregation pipeline to take all the data from feature plugins and join them together into a document in the form required by the user experience. These changes can be made in parallel to each feature plugin, and the aggregation can be done as a new analytics application in an analytics service plugin. For each plugin, the process of integrating with data management 214 may be the same: first, the plugin can register a new schema version describing the additional data that would be sent. Then, the plugin can consume new versions of schemas from their dependencies. Finally, a new schema version can be produced—in the case of a backwards-incompatible update, this might be a fork of the code for the new tool so that both versions are produced. Data management 234 can ensure that consumers are able to quickly get updates from producers so that the aggregated view can be a near-real-time representation of what is happening in the underlying tools. Finally, the user interface can migrate from its test data set to the real data coming from the aggregation pipeline.

In another example, an update to an existing feature can be made using the extensibility and adaptability provided by control plane 230. For example, if minor update (from a customer experience perspective) were to be made to an existing feature plugin, then new data may need to be provided from the plugin to the client. The process of working with data management 234 can be identical to what goes on for a new feature; working backwards from user experience, any data aggregation layers that are needed may be designed, and new schema versions for the feature plugin may be added. However, in some cases generalizable schema traits can be used further shorten the development process for the update. For example, a new text field input is added to a project, traits in the schema could allow each layer (the aggregation as well as the client plugins) to add user interface treatments to most attributes of the project generically. In some cases, the feature plugin may be able to add a backwards-compatible update with an appropriately decorated schema and have the new information show up in the UI 214 without any work on other tools 250.

Data producers write data to data set management 234, either in the form of an event stream or a set of documents that the producers update over time, in some embodiments. Data producers advertise schemas to which the data they publish is expected (and enforced) to conform. Data consumers can subscribe to events or document updates and retrieve data from data management 234, relying upon a feature of data set management 234 that will return data that's valid according to the advertised schema. Plugins can be both producers and consumers, but in some scenarios not for the same data. For example, text search 252f may be a subscriber to various documents events that add, delete, or modify documents in order to make corresponding updates to inverted indexes.

Figure 3:
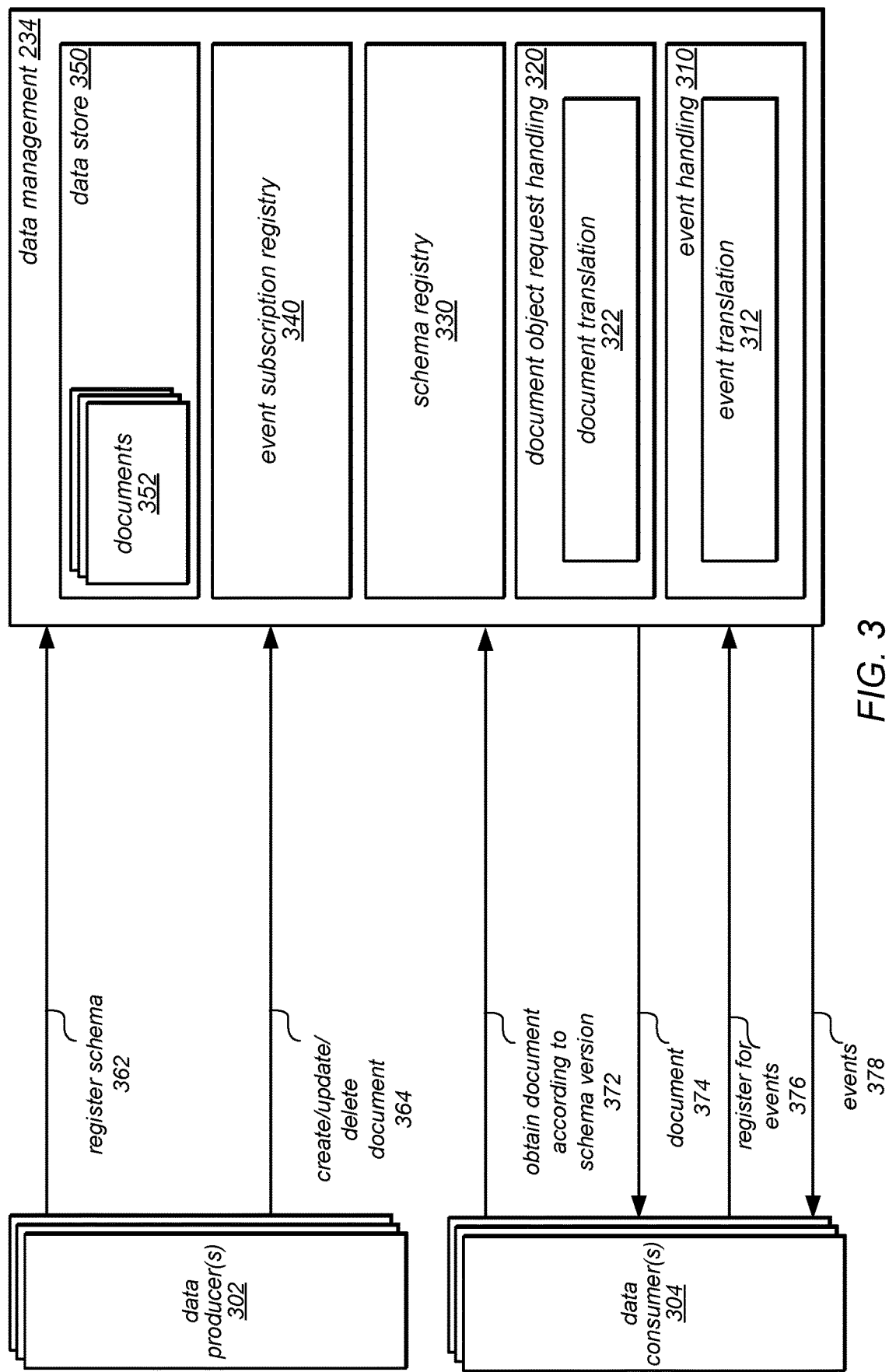
FIG. 3 is a block diagram illustrating data set management, according to some embodiments.

FIG. 3 is a block diagram illustrating an example data management system for the application development, build, deployment, and delivery service, according to some embodiments. Data management 234 may implement different types of request handling. Event handling 310 may perform event translation as part of handling different events, as discussed in detail below with regard to FIG. 6. Document object request handling 320 may perform document translation 322 as part of handling different document object requests.

For example, document object request handling 320 may receive document update requests, such as update request (e.g., to create, modify, or delete a document object). Document object request handling 320 may send a request to get applicable schema version(s) from schema registry 330. Schema registry 330 may identify the applicable schema versions (e.g., from mapping information) or may identify them from identifiers in the request. Schema registry may return the schema version(s) to document object request handling. Document object request handling 320 may use the schemas to determine the update fails to satisfy the schema(s), such as failing to satisfy a current version of the schema. If so, then a rejection of the update as invalid may be sent. Document object request handling 320 may then send a request to data store 350 to update the document according to the request. Document object request handling 320 may also send a notification of an update document event to event handling 310.

Similar techniques to those depicted with regard to document update can be performed to create a new document. For example, a create document request can be received at document object request handling 320, which include information, such as a file (or location thereof), or other information used to create the document. Again, document object request handling 320 may get applicable schema version(s) 320 so that document object request handling 320 can determine which schema version to apply to create the document. For example, the document may one of many documents that are created according to the same schema. Which schema version is applied may correspond to which plugin (e.g., which tool or other feature) submitted the document creation request. Mapping information may, for example, be used to determine which schema version is applicable to which requestor. In some embodiments, the request itself may specify the schema version. Document object request handling 320 may then store the document to data store 350. An event may be triggered or sent to event handling 310.

Schema registry 330 may provide storage for different schema versions, translation instructions and other schema information. A request to register a schema 362 may be received. For example, an interface of a data management system, like data management system 110 or 234, may support registration requests (e.g., via API, graphical user interface, command line interface, and so on), in order to provide a new version of a schema (e.g., specified as a JSON or other script, programming code, or language) with an associated data object (e.g., a document or event stream). In some embodiments, the schema may include or link to instructions (e.g., scripts, programming code, or language) for translating between the version of the schema being registered and one or more prior versions of the schema (e.g., describing what data field was added, changed, removed, etc.).

The registration request may be rejected, in some embodiments, if the request or updated schema fails a validation technique, such as analysis indicating that the version of the schema fails to conform to various stylistic or other constraints on schemas (e.g., using invalid data types). A response indicating that the registered version of the schema is invalid may be returned.

The version of the schema may be added to a registry 330 for schemas for data objects, in some embodiments. For example, a database or other data storage system may store a schema as a document, file, or other object. A link, mapping, or other association may be updated to identify which data object(s) (e.g., event stream or document) the schema is applicable to (e.g., a version number, a schema identifier and data object identifiers).

Event subscription registry 340 may support storage for data consumers to register for events. Data store 350 may store data for data objects, such as documents 352 and event streams (not illustrated).

Data producers may submit various requests, including registering a schema 362, creating, updating, or deleting a document, as indicated at 364, creating an event stream, or submitting events. For example, data consumers may submit various requests and receive various responses, including requests to obtain a document according to a schema version, as indicated at 372, receive the document 374, register for events, as indicated at 376, and receive events, as indicated at 378. For example, document object request handling 320 may handle requests to obtain documents. Document object request handling 320 may get the applicable schema versions from schema registry 330. Document object request handling 320 may also get the document from data store 350. If translation should be performed, then translation instructions may be used and the document sent to the data consumer 304.

Similarly, in another example, events may be received either from their submission to data management 234 as part of an event stream or as an event related to a document update or creation (as noted above). Event handling 310 may send a request to get applicable schema(s) for the event to schema registry 330. Schema registry may identify the applicable schemas (e.g., based on mapping information) or may return those schema(s) identified in the request (e.g., by version and schema identifier). The schemas may be returned.

Event handling 310 may use the schemas to evaluate the validity of the event. If the event does not satisfy the schema(s), then it may be rejected, as indicated at 607. If valid, event handling 310 may send a request to event subscription registry to get 609 subscribers for the event (e.g., subscribers to an event stream or document). Event subscription registry 340 may return the subscribers. Event handling 310 may determine, based on the subscribers, whether translation should be performed (e.g., does an event subscription have a schema version identifier matching the event, or an earlier schema). If translation should not be performed, then the event is sent. If translation should be performed, then translation may be performed using translation instructions between schemas and the translated event sent.

Figure 4:
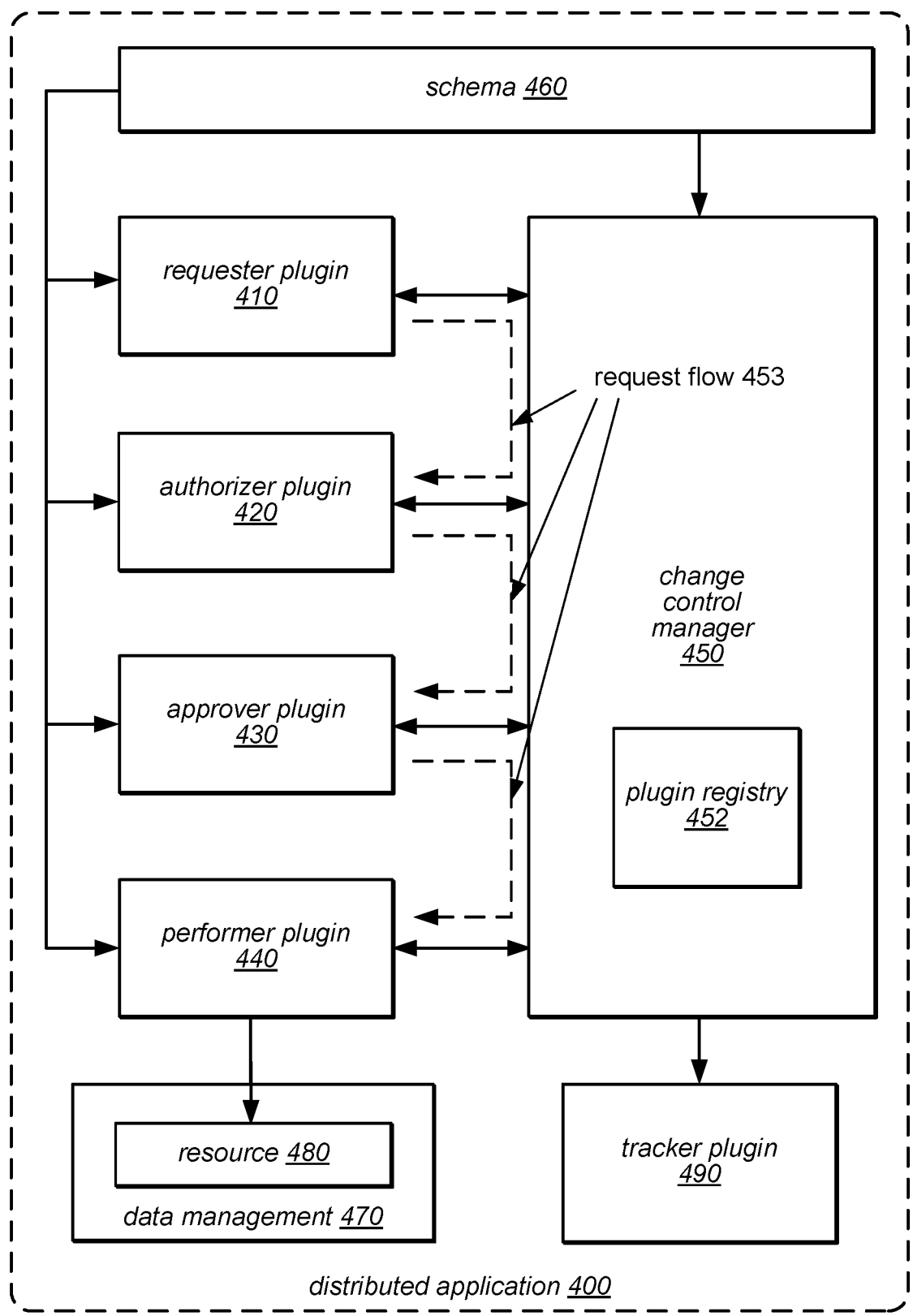
FIG. 4 is a block diagram illustrating extensible change control management, according to some embodiments.

FIG. 4 is a block diagram illustrating extensible change control management, according to some embodiments. Distributed application 400, such as an application that utilizes various plugin components to integrate, support, and extend the capabilities of the distributed application 400, may include a change control manager 450 which may implement changes to a resource 480 stored in data management 470 using various plugins 410, 420, 430 and 440, in some embodiments, identified in plugin registry 452. Plugin registry 452 may be a registry for a single resource (or organized to group registered plugins by resource) in a data structure (e.g., table, index, etc.). The resource 480 may be of a particular resource type, with the resource type having an associated schema 460. Various change operations for the resource 480 may be encoded using the schema 460, and the various plugins 410, 420, 430 and 440 as well as the change control manager 450 may access the schema 160 during communication of these operations.

A requester plugin 410 may submit requests for changes to the resource to change control manager 450. These requests for changes may follow a typical request flow 453. These requesters may, in some embodiments, provide various user interfaces (UIs) or Application Programming Interfaces (APIs) or other programmatic interfaces to allow users to submit change requests to the change control manager. In other embodiments, a requester plugin may perform other plugin roles for the resource of for other resources and may submit change requests as part of fulfilling other plugin roles. These examples, however, are not intended to be limiting, and any number of requester plugin implementations may be envisioned.

An authorizer plugin 420 may authorize or reject change requests submitted to the change control manager 450 by requester plugins. An approver plugin 430 may approve or reject change requests submitted to the change control manager 450 by requester plugins. A given resource may have any number of registered approver plugins in plugin registry 452, in various embodiments.

A performer plugin 440 may perform approved change requests submitted to the change control manager 450 by requester plugins. In some embodiments, a plugin may implement more than one plugin function for a resource or the same or different plugin functions for different resources. For example, in some embodiments, a plugin may implement both an approver plugin function as well as a performer plugin function for a resource, as discussed below. It should be understood, however, that some combinations of plugin functions may not be allowed, for example, a plugin implementing both a requester function and an approver function for the same resource. These examples, however, are not intended to be limiting and any number of plugin implementations may be imagined.

In addition, a tracking plugin 490 may receiving notifications of various events associated with the resource 480. A change performer plugin component 440 may advertise possible changes and reference the projected consequences to a resource 480 stored within data management 470.

For example, a performer plugin 430 may advertise a change to merge a pull request with the consequence that the tip of the destination branch will change. Change approver plugin 430 may be required to record approval in change control manager 450 before a change can proceed. For example, if it is desirable to use an advisory time window plugin, that plugin would have to approve changes to deployed environments before they are enacted—a time window plugin would reject changes that take place during an advisory period. Change approver plugins 430 can pre-approve a change where applicable. For example, when evaluating whether a user can merge a pull request, in most cases it is not necessary to wait for a user to actually request the merge to determine if it is allowed. Change requester plugin 410 may start the process of enacting a change.

These requester plugins could be client plugins that provide user interfaces (UIs) that make these requests on behalf of end users but they could also be feature plugins. For example, a delivery pipeline plugin (e.g., plugin 242d as shown below in FIG. 2) could be a change requester 410 and initiate changes to each target resource according to its orchestration rules instead of directly performing these changes itself. Finally, change performers 440 complete the process by enacting approved changes and recording the results in change control manager 160 and data management 470. Plugins may perform combinations of these roles, but it may be rare, in some scenarios, for a plugin to perform multiple roles for the same type of change—for example, it is not expected that a plugin will be an approver for its own changes.

FIG. 5 is a diagram illustrating a pipeline specification, according to some embodiments. A pipeline specification may be represented in a variety of ways, in various embodiments. For example, in some embodiments a pipeline specification may be provided in the form of a computer-readable text configuration file encoded in a human-readable format. Examples of such human-readable format are XML, JSON and YAML, although and encoding may be employed. It should be understood, however, that any format, either human-readable or other format, may be employed and that the human-readable format used in FIG. 5 is chosen merely for clarity and is not intended to be limiting.

A pipeline specification 500, such as the pipeline specification 170 of FIG. 1, may include a name field suitable for identifying pipelines created and executed according to the pipeline specification 500, in some embodiments. Such a field may be useful in monitoring and reporting of various automation activities performed by an automation execution coordinator, such as the execution coordinator 110 as shown in FIG. 1. It should be understood, however, that other fields identifying the pipeline specification or pipelines defined according to the specification may be employed, for example any of a variety of tag fields, and the example name field is not intended to be limiting.

The pipeline specification may also, in some embodiments, include a trigger definition, such as is shown in 512, 514, 516, 518, 520, 522, 524 and 526. The trigger definition may be identified by the Triggers identifier 512 and include a specification of event types, such as the Types: identifier 514, in some embodiments. In the example, a trigger may occur responsive to detecting a Push operation, that is data being pushed, or written, to data stored in a repository. It should be understood, however, that this is merely one example of an event trigger and that many triggers many be imagined.

The trigger definition 512 may also include identification of a data source for the pipeline to which triggering events may occur, in some embodiments. In the example Destinations 516 and Branches 518 and 520 serve to identify branches of repositories that match the pipeline definition, in the particular example all development (dev) branches of all repositories may match the pipeline definition. In addition, particular files(s) within the branch may be specified, as is shown in 522, 524 and 526. In this example, only pushes, or writes, to files in the source (src) or test (tst) directories of development (dev) branches of repositories may match the pipeline specification. It should be understood, however, that this is merely one example of a data source definition and that many data source definitions many be imagined.

The pipeline specification may also, in some embodiments, include a set of Actions to be performed by the automation, as shown in 528-560. In the example, three Actions are defined to be performed, a Build Action 530, a RunUnitTests Action 542 and a CheckLicense Action 560. Within each Action, Identifier (532, 544, 556) and Configuration (534, 546, 558) fields may provide additional information for each Action, including a name for the Action such as shown in 536, 548 and 560, in some embodiments. Additionally, Inputs and Outputs for the Actions may also be specified, such as in 538, 540, 550 and 552.

It should be understood that the above fields are merely examples of the possible contents of pipeline specifications 500, that many kinds of information to automate many kinds of Actions may be envisioned and that the above example is merely an illustration not intended to be limiting.

FIG. 6 is a diagram illustrating a pipeline specification defined using a pipeline specification template, according to some embodiments. A pipeline specification template may be represented in a variety of ways, in various embodiments. For example, in some embodiments a pipeline specification template may be provided in the form of a computer-readable text configuration file encoded in a human-readable format. Examples of such human-readable format are XML, JSON and YAML, although and encoding may be employed. It should understood, however, that any format, either human-readable or other format, may be employed and that the human-readable format used in FIG. 6 is chosen merely for clarity and is not intended to be limiting.

A pipeline specification template 600 may include a name field suitable for identifying pipelines created and executed according to the pipeline specification 600, in some embodiments. Such a field may be useful in monitoring and reporting of various automation activities performed by an automation execution coordinator, such as the execution coordinator 110 as shown in FIG. 1. It should be understood, however, that other fields identifying the pipeline specification template or pipelines defined according to the specification may be employed, for example any of a variety of tag fields, and the example name field is not intended to be limiting.

The pipeline specification template may also, in some embodiments, include a trigger definition, such as is shown in 612, 614, 616, 618, 620 and 621. The trigger definition may be identified by the Triggers identifier 612 and include a specification of event types, such as the Types: identifier 614, in some embodiments. In the example, a trigger may occur responsive to detecting a Push operation, that is data being pushed, or written, to data stored in a repository. It should be understood, however, that this is merely one example of an event trigger and that many triggers many be imagined.

The trigger definition 612 may also include identification of a data source for the pipeline to which triggering events may occur, in some embodiments. In the example Destinations 616 and Branches 518 and 520 serve to identify branches of repositories that match the pipeline definition, in the particular example all release branches of all repositories may match the pipeline definition. It should be understood, however, that this is merely one example of a data source definition and that many data source definitions many be imagined. The trigger definition 612 may further include a Context 621 which may allow for the overriding of a default execution context determination with a custom context, in some embodiments.

The pipeline specification template may also, in some embodiments, include a set of Actions to be performed by the automation, as shown in 622-660. In the example, three Actions are defined to be performed, a Build Action 624, a Test Action 636 and a Deploy Action 648. Within each Action, Identifier (626, 638, 654) and Configuration (628, 640, 656) fields may provide additional information for each Action, including a name for the Action such as shown in 630 and 642 in some embodiments. Additionally, Inputs and Outputs for the Actions, such as in 632, 634, 644 and 646, target locations, such as BucketName 658, and parameters controlling the Actions, such as 660, may also be specified, in some embodiments. Also shown in the example is a dependency field in 650 and 652 which may serve to define a sequence of execution for a pipeline, in some embodiments.

In addition, the pipeline specification template may also, in some embodiments, include a set of variables, or parameters, usable to generate pipeline specifications from the template. In the illustrated example, various Name fields 630, 642 and 658 are defined by means of such variables or parameters. When the template is invoked, current values of the defined variable or parameters may be used to define corresponding fields in the resulting pipeline specification.

It should be understood that the above fields are merely examples of the possible contents of pipeline specifications template 600, that many kinds of information to automate many kinds of Actions may be envisioned and that the above example is merely an illustration not intended to be limiting.

A pipeline specification 610, such as the pipeline specification 170 of FIG. 1, may include an Import identifier, such as 670 and 672, to identify a pipeline specification template to be invoked to define the pipeline specification, in some embodiments. The pipeline specification 610 may also include, in some embodiments, definitions for a number of template variables or parameters, such as 662, 664, 667, 668 and 669 that are usable within the template to define the pipeline specification. Such template variables or parameters may include names, executable code, external references to executable functions, and so on that allow for the customization of various aspects of the pipeline specification template, in some embodiments. It should be understood, however, that this is merely one example of a pipeline specification using a pipeline specification template and that many such specifications may be imagined.

Figure 7:
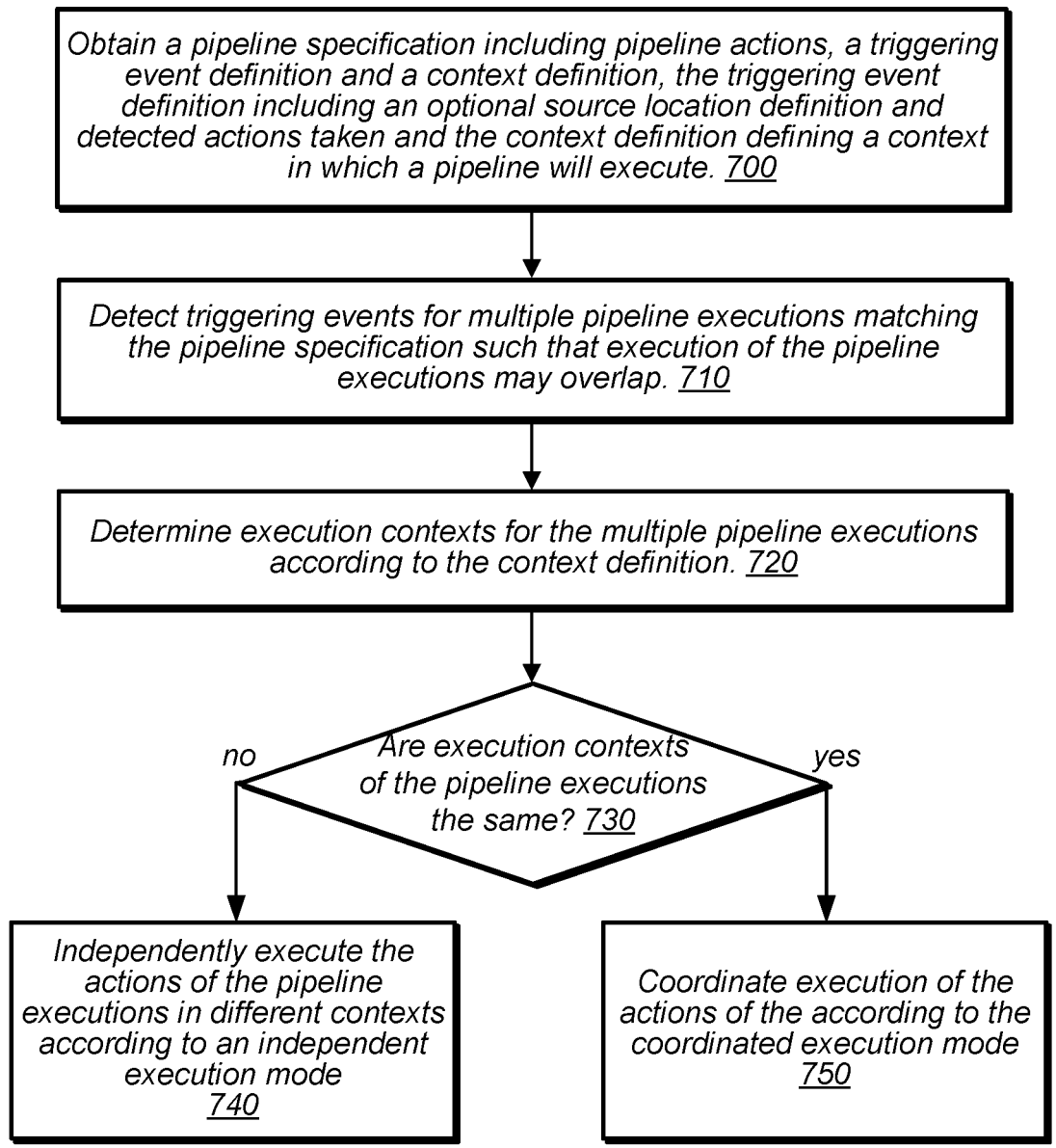
FIG. 7 is a flow diagram illustrating execution of pipelines using unified pipeline specifications, according to some embodiments.

FIG. 7 is a flow diagram illustrating execution of pipeline executions using unified pipeline specifications, according to some embodiments. The process begins in step 700, where a pipeline specification, such as the pipeline specification 170 of FIG. 1, may be obtained that is defined such as in the manner shown in FIGS. 5 and 6 above, in some embodiments. For example, a user interface may be used to receive the pipeline specification. In some embodiments, the pipeline specification may be edited, stored, or otherwise defined and later accessed, in some embodiments. The pipeline specification may include a number of pipeline actions, such as Actions 528, 542 and 554 of FIG. 5, a triggering event definition, such as the Triggers 512 of FIG. 5, and context definition defining a context in which a pipeline will execute. The context definition may be a default specification that determines context by locations of source data related to the triggering event, in some embodiments. The pipeline specification may also include context definition overrides to further control determination of context, in some embodiments. The pipeline specification may defined, in some embodiments, responsive to input provided via programmatic interface from a user, while in other embodiments may be generated from a template, such as is discussed about in FIG. 6. It should be understood, however, that these are merely examples of pipeline specification definition and that many techniques may be imagined.

As shown in 710, triggering events, such as events 150 of FIG. 1, matching a trigger definition of the pipeline specification, may then be detected, in some embodiments. These event detections may occur sufficiently concurrently that execution of multiple resulting pipeline executions triggered by the events may overlap. For example, an event may be detected matching the pipeline specification resulting in the execution of a first pipeline execution. Prior to completion of the first pipeline, another, subsequent event may be detected matching the pipeline specification resulting in the execution of a second pipeline execution. The above example is not intended to be limiting and any sequence of detected events may be imagined resulting in the overlap of multiple pipeline execution s.

As shown in 720, execution contexts, such as context(s) 120 as shown in FIG. 1, may then be determined according to the context definition of the pipeline specification. In some embodiments, execution contexts may be determined by locations of source data related to the triggering event. The above example determination is not intended to be limiting and any determination of execution context may be imagined.

Then, a determination of an execution type may be made according to whether the pipeline executions have the same execution context, as shown in 730, in some embodiments. If the pipelines do not have the same execution context, as shown in a negative exit from 730, the actions of the pipeline executions may then be independently executed in different contexts according to an independent mode, as shown in 740, in some embodiments.

If, however, the pipelines have the same context, as shown in a positive exit from 730, the actions of the pipeline executions may then be coordinated for execution in the same context according to a coordinated mode, as shown in 750, in some embodiments. In various embodiments, coordination may occur in a variety of ways. For example, in some embodiments, pipeline executions sharing a context may be executed one at a time, sequentially based on order of triggering. In other embodiments, all or portions of actions defined in some pipelines may be canceled responsive to determining that similar actions are to be performed in more recently triggered pipelines. In still other embodiments, parameters for executing actions of some pipelines may be updated responsive to the triggering of additional pipelines sharing the context. These examples, however, are not intended to be limiting and any manner of coordination of pipelines may be imagined.

Figure 8:
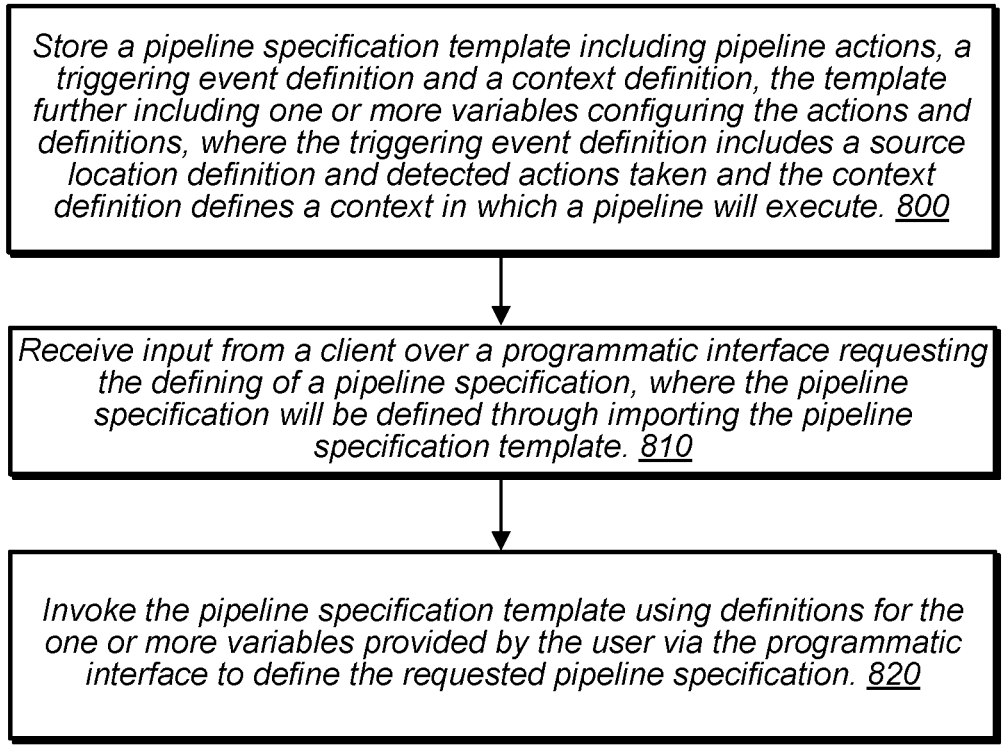
FIG. 8 is a flow diagram illustrating defining a pipeline specification using a pipeline specification template, according to some embodiments.

FIG. 8 is a flow diagram illustrating defining a pipeline specification using a pipeline specification template, according to some embodiments. The process begins in step 800, where a pipeline specification template, such as the pipeline specification template 600 of FIG. 6, may be stored. The pipeline specification template may include a number of pipeline actions, such as Actions 624, 636 and 648 of FIG. 6, a triggering event definition, such as the Triggers 612 of FIG. 6, and context definition defining a context in which a pipeline will execute. The context definition may be a default specification that determines context by locations of source data related to the triggering event, in some embodiments. The pipeline specification template may also include context definition overrides to further control determination of context, in some embodiments. The pipeline specification template may include one or more variables to configure the various actions and definitions of resulting pipeline specifications, such as in 630, 642 and 658 of FIG. 6. The pipeline specification template may be defined, in some embodiments, responsive to input provided via programmatic interface from a user.

As shown in 810, a pipeline specification, such as the pipeline specification 170 of FIG. 1, may be defined according to the pipeline specification template. The pipeline specification may be defined, in some embodiments, responsive to input of a specification such as the pipeline specification 610 of FIG. 6, provided via programmatic interface from a user. The input specification may include an identifier of the template, such as shown in 670 and 672 of FIG. 6, as well as definitions for the one or more variables of the template, in some embodiments.

The pipeline specification may be defined by invoking the pipeline specification template with the variable definitions provided in the input specification, in some embodiments, as shown in 820.

Figure 9:
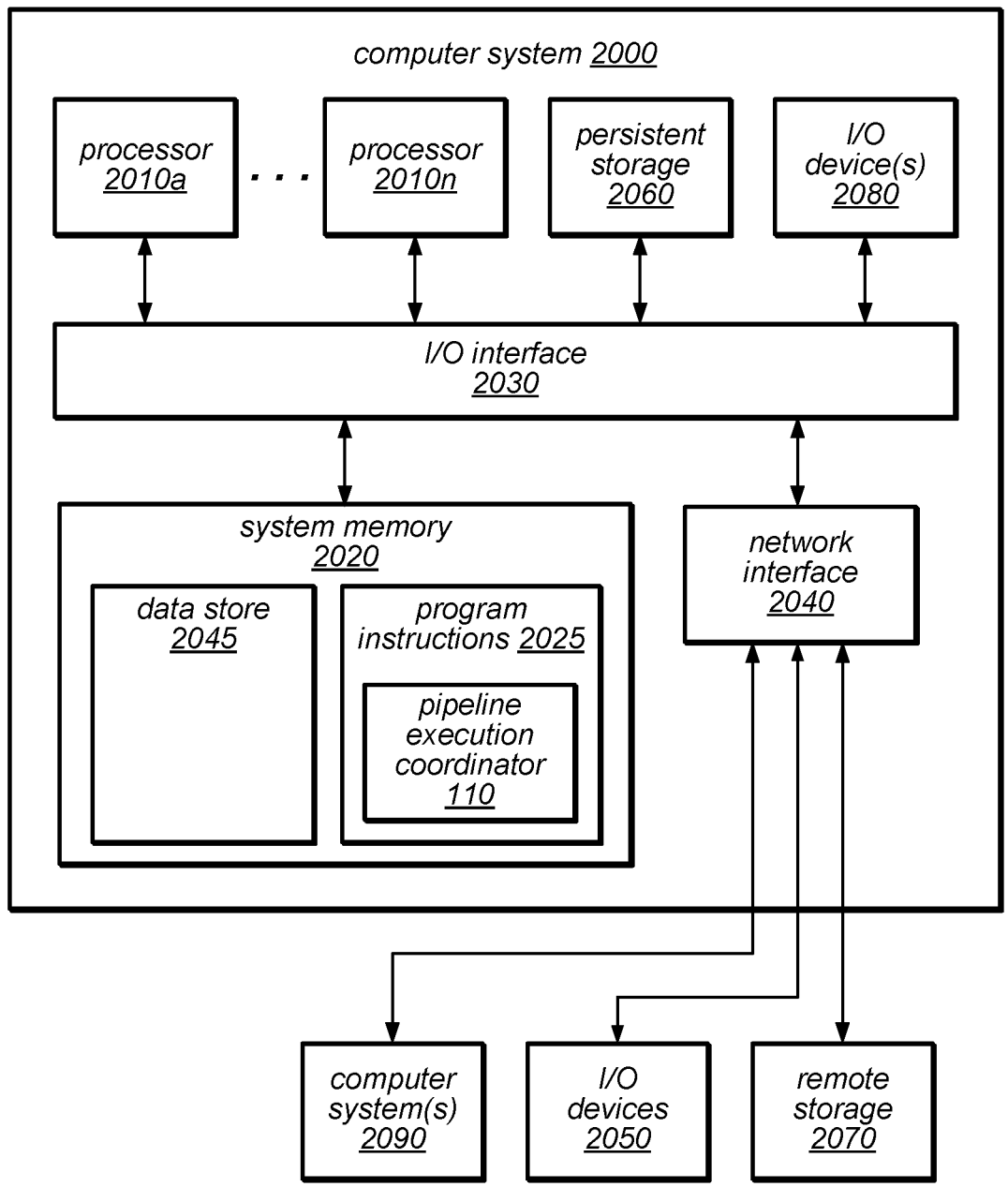
FIG. 9 is a block diagram illustrating an example computer system, according to various embodiments.

Any of various computer systems may be configured to implement processes associated with a technique for multi-region, multi-primary data store replication as discussed with regard to the various figures above. FIG. 9 is a block diagram illustrating one embodiment of a computer system suitable for implementing some or all of the techniques and systems described herein. In some cases, a host computer system may host multiple virtual instances that implement the servers, request routers, storage services, control systems or client(s). However, the techniques described herein may be executed in any suitable computer environment (e.g., a cloud computing environment, as a network-based service, in an enterprise environment, etc.).

Various ones of the illustrated embodiments may include one or more computer systems 2000 such as that illustrated in FIG. 9 or one or more components of the computer system 2000 that function in a same or similar way as described for the computer system 2000.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030. In some embodiments, computer system 2000 may be illustrative of servers implementing enterprise logic or downloadable applications, while in other embodiments servers may include more, fewer, or different elements than computer system 2000.

Computer system 2000 includes one or more processors 2010 (any of which may include multiple cores, which may be single or multi-threaded) coupled to a system memory 2020 via an input/output (I/O) interface 2030. Computer system 2000 further includes a network interface 2040 coupled to I/O interface 2030. In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA. The computer system 2000 also includes one or more network communication devices (e.g., network interface 2040) for communicating with other systems and/or components over a communications network (e.g. Internet, LAN, etc.). For example, a client application executing on system 2000 may use network interface 2040 to communicate with a server application executing on a single server or on a cluster of servers that implement one or more of the components of the embodiments described herein. In another example, an instance of a server application executing on computer system 2000 may use network interface 2040 to communicate with other instances of the server application (or another server application) that may be implemented on other computer systems (e.g., computer systems 2090).

System memory 2020 may store instructions and data accessible by processor 2010. In various embodiments, system memory 2020 may be implemented using any suitable memory technology, such as static random-access memory (SRAM), synchronous dynamic RAM (SDRAM), non-volatile/Flash-type memory, or any other type of memory. In the illustrated embodiment, program instructions and data implementing desired functions, such as those methods and techniques as described above for a pipeline execution coordinator, as indicated at 110, for the downloadable software or provider network are shown stored within system memory 2020 as program instructions 2025. In some embodiments, system memory 2020 may include data store 2045 which may be configured as described herein.

In some embodiments, system memory 2020 may be one embodiment of a computer-accessible medium that stores program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 2000 via I/O interface 2030. A computer-readable storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. Further, a computer-accessible medium may include transmission media or signals such as electrical, electromagnetic, or digital signals, conveyed via a communication medium such as a network and/or a wireless link, such as may be implemented via network interface 2040.

In one embodiment, I/O interface 2030 may coordinate I/O traffic between processor 2010, system memory 2020 and any peripheral devices in the system, including through network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments, some or all of the functionality of I/O interface 2030, such as an interface to system memory 2020, may be incorporated directly into processor 2010.

Network interface 2040 may allow data to be exchanged between computer system 2000 and other devices attached to a network, such as between a client device and other computer systems, or among hosts, for example. In particular, network interface 2040 may allow communication between computer system 800 and/or various other device 2060 (e.g., I/O devices). Other devices 2060 may include scanning devices, display devices, input devices and/or other communication devices, as described herein. Network interface 2040 may commonly support one or more wireless networking protocols (e.g., Wi-Fi/IEEE 802.7, or another wireless networking standard). However, in various embodiments, network interface 2040 may support communication via any suitable wired or wireless general data networks, such as other types of Ethernet networks, for example. Additionally, network interface 2040 may support communication via telecommunications/telephony networks such as analog voice networks or digital fiber communications networks, via storage area networks such as Fibre Channel SANs, or via any other suitable type of network and/or protocol.

In some embodiments, I/O devices may be relatively simple or "thin" client devices. For example, I/O devices may be implemented as dumb terminals with display, data entry and communications capabilities, but otherwise little computational functionality. However, in some embodiments, I/O devices may be computer systems implemented similarly to computer system 2000, including one or more processors 2010 and various other devices (though in some embodiments, a computer system 2000 implementing an I/O device 2050 may have somewhat different devices, or different classes of devices).

In various embodiments, I/O devices (e.g., scanners or display devices and other communication devices) may include, but are not limited to, one or more of: handheld devices, devices worn by or attached to a person, and devices integrated into or mounted on any mobile or fixed equipment, according to various embodiments. I/O devices may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 2000. In general, an I/O device (e.g., cursor control device, keyboard, or display(s) may be any device that can communicate with elements of computing system 2000.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein.

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

Embodiments of decentralized application development and deployment as described herein may be executed on one or more computer systems, which may interact with various other devices. FIG. 9 is a block diagram illustrating an example computer system, according to various embodiments. For example, computer system 2000 may be configured to implement nodes of a compute cluster, a distributed key value data store, and/or a client, in different embodiments. Computer system 2000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of compute node, computing node, or computing device.

In the illustrated embodiment, computer system 2000 also includes one or more persistent storage devices 2060 and/or one or more I/O devices 2080. In various embodiments, persistent storage devices 2060 may correspond to disk drives, tape drives, solid state memory, other mass storage devices, or any other persistent storage device. Computer system 2000 (or a distributed application or operating system operating thereon) may store instructions and/or data in persistent storage devices 2060, as desired, and may retrieve the stored instruction and/or data as needed. For example, in some embodiments, computer system 2000 may be a storage host, and persistent storage 2060 may include the SSDs attached to that server node.

In some embodiments, program instructions 2025 may include instructions executable to implement an operating system (not shown), which may be any of various operating systems, such as UNIX, LINUX, Solaris™, MacOS™, Windows™, etc. Any or all of program instructions 2025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 2000 via I/O interface 2030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 2040.

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
one or more processors; and
a memory storing program instructions that, when executed on the one or more processors, implement a pipeline execution coordinator configured to:
obtain a pipeline specification comprising an action and a triggering event definition, wherein the triggering event definition further comprises a data source definition and a trigger action detected on a data source stored in a location identified by the data source definition;
detect respective triggering events, including a first triggering event and a second triggering event, to cause execution of respective actions of two pipeline executions managed by the pipeline execution coordinator, wherein the first triggering event and the second triggering event match the pipeline specification, and wherein the second triggering event occurs subsequent to the first triggering event; and
responsive to the detecting, concurrently automate execution of the respective actions of the two pipeline executions, wherein to concurrently automate execution of the respective actions of the two pipeline executions the pipeline execution coordinator is configured to:
identify respective contexts for the two pipeline executions based at least in part on the first triggering event, the second triggering event and the triggering event definition;
select an execution mode of a plurality of different execution modes according to a determination of whether the respective contexts of the two pipeline executions are the same, wherein the selected execution mode is an independent execution mode if the respective contexts are not the same, and wherein the selected execution mode is a coordinated execution mode if the respective contexts of the two pipeline executions are determined to be the same; and
cause execution of the respective actions of the two pipeline executions according to the selected execution mode, wherein the independent execution mode causes the pipeline execution coordinator to independently execute the respective actions of the two pipeline executions; and wherein the coordinated execution mode causes the pipeline execution coordinator to coordinate execution of the respective actions of the two pipelines.

2. The system of claim 1, wherein the data source definition specifies one or more data source locations including the location, and wherein the respective contexts are based at least in part on respective data source locations of the one or more data source locations containing the respective data sources.

3. The system of claim 1, wherein to obtain the pipeline specification, the pipeline execution coordinator is configured to:
receive a request to define the pipeline specification from a user via a user interface; and
invoke a pipeline specification template including one or more specification variables defined for said invoking.

4. The system of claim 1, wherein the two pipeline executions respectively automate application development processes and wherein the pipeline execution coordinator is provided as part of an application service of a provider network.

5. A computer-implemented method comprising:
obtaining, from a client, a pipeline specification comprising an action and a triggering event definition; and
concurrently automating execution of respective actions of two pipeline executions matching the pipeline specification responsive to detecting respective triggering events for the two pipeline executions, wherein concurrently automating execution of the respective actions comprises:

identifying respective contexts for the two pipeline executions based, at least in part, on the respective triggering events and the triggering event definition;

selecting an execution mode of a plurality of different execution modes according to a determination of whether the respective contexts of the two pipeline executions are the same, wherein the selected execution mode is a coordinated execution mode if the respective contexts of the two pipeline executions are determined to be the same, and wherein the selected execution mode is an independent execution mode if the respective contexts are not the same; and causing, on behalf of the client, execution of the respective actions of the two pipeline executions according to the selected execution mode, wherein the independent execution mode causes independent execution of the respective actions of the two pipeline executions, and wherein the coordinated execution mode causes coordinated execution of the respective actions of the two pipeline executions.

6. The method of claim 5, wherein the triggering event definition comprises a data source definition and an action detected on a data source stored in a location identified by the data source definition.

7. The method of claim 6, wherein the data source definition specifies one or more data source locations including the location, and wherein identifying the respective contexts is performed based at least in part on respective data source locations of the one or more data source locations containing the respective data sources.

8. The method of claim 7, wherein determining that the respective contexts of the two pipeline executions are the same comprises determining that the two pipeline executions access a same data source location.

9. The method of claim 5, wherein identifying the respective contexts for the two pipeline executions is performed based at least in part on a custom context definition overriding a default context definition for the triggering event definition.

10. The method of claim 5, wherein obtaining the pipeline specification comprises invoking a pipeline specification template including one or more specification variables defined for said invoking.

11. The method of claim 5, wherein obtaining the pipeline specification comprises receiving a request to define the pipeline specification from a user via a user interface.

12. The method of claim 11, wherein the two pipeline executions respectively automate application development processes, wherein the obtaining of the pipeline specification and the automating of the two pipelines are provided as part of an application service of a provider network.

13. One or more non-transitory computer-accessible storage media storing program instructions that when executed on or across one or more computing devices cause the one or more computing devices to perform:

obtaining, from a client, a pipeline specification comprising an action and a triggering event definition; and concurrently automating execution of respective actions of two pipeline executions matching the pipeline specification responsive to detecting respective triggering events for the two pipeline executions, wherein concurrently automating execution of the respective actions comprises:

identifying respective contexts for the two pipeline executions based at least in part on the respective triggering events and the triggering event definition;

selecting an execution mode of a plurality of different execution modes according to a determination of whether the respective contexts of the two pipeline executions are the same, wherein the selected execution mode is a coordinated execution mode if the respective contexts of the two pipeline executions are determined to be the same, and wherein the selected execution mode is an independent execution mode if the respective contexts are not the same; and causing, on behalf of the client, execution of the respective actions of the two pipeline executions according to the selected execution mode, wherein the independent execution mode causes independent execution of the respective actions of the two pipeline executions, and wherein the coordinated execution mode causes coordinated execution of the respective actions of the two pipeline executions.

14. The one or more non-transitory computer-accessible storage media of claim 13, wherein the triggering event definition comprises a data source definition and an action detected on a data source stored in a location identified by the data source definition.

15. The one or more non-transitory computer-accessible storage media of claim 14, wherein the data source definition specifies one or more data source locations including the location, and wherein identifying the respective contexts is performed based at least in part on respective data source locations of the one or more data source locations containing the respective data sources.

16. The one or more non-transitory computer-accessible storage media of claim 13, wherein determining that the respective contexts of the two pipeline executions are the same comprises determining that the two executions access a same data source location.

17. The one or more non-transitory computer-accessible storage media of claim 13, wherein identifying the respective contexts for the two pipeline executions is performed based at least in part on a custom context definition overriding a default context definition for the triggering event definition.

18. The one or more non-transitory computer-accessible storage media of claim 13, wherein determining the pipeline specification comprises invoking a pipeline specification template including one or more specification variables defined for said invoking.

19. The one or more non-transitory computer-accessible storage media of claim 13, wherein determining the pipeline specification comprises obtaining pipeline specification information from a user via an application programming interface.

20. The one or more non-transitory computer-accessible storage media of claim 19, wherein the two pipeline executions respectively automate application development processes, wherein the determining of the pipeline specification and the automating of the two pipelines are provided as part of an application development, build, deliver, and deployment service of a provider network.

* * * * *